United States Patent
Seibold (10) Patent No.: US 8,899,684 B2
(45) Date of Patent: Dec. 2, 2014

(54) SECOND ROW PACKAGE

(75) Inventor: Kurt A. Seibold, Whitmore Lake, MI (US)

(73) Assignee: Johnson Controls Techonology Company, Holland, MI (US)

(*) Notice: Subject to any disclaimer, the term of this patent is extended or adjusted under 35 U.S.C. 154(b) by 159 days.

(21) Appl. No.: 13/703,918

(22) PCT Filed: Jun. 27, 2011

(86) PCT No.: PCT/US2011/041956
§ 371 (c)(1),
(2), (4) Date: Jan. 7, 2013

(87) PCT Pub. No.: WO2012/003149
PCT Pub. Date: Jan. 5, 2012

(65) Prior Publication Data
US 2013/0093229 A1  Apr. 18, 2013

Related U.S. Application Data (60) Provisional application No. 61/434,226, filed on Jan. 19, 2011, provisional application No. 61/360,568, filed on Jul. 1, 2010.

(51) Int. Cl.
| | |
|---|---|
| *B60N 2/10* | (2006.01) |
| *B60N 2/20* | (2006.01) |
| *B60N 2/30* | (2006.01) |
| *B60N 2/18* | (2006.01) |
| *B60N 2/36* | (2006.01) |

(52) U.S. Cl.
CPC ............ *B60N 2/3002* (2013.01); *B60N 2/1842* (2013.01); *B60N 2/3065* (2013.01); *B60N 2/3013* (2013.01); *B60N 2/36* (2013.01); *B60N 2/1821* (2013.01); *B60N 2/1803* (2013.01)
USPC ........ 297/378.1; 297/313; 297/316; 297/325; 297/334; 297/337

(58) Field of Classification Search
USPC ......... 297/311, 313, 316, 315, 321, 325, 331, 297/334, 337, 378.1, 330, 344.25, 451.2, 297/451.3
See application file for complete search history.

(56) References Cited

U.S. PATENT DOCUMENTS

| | | | | |
|---|---|---|---|---|
| 127,891 | A | * | 6/1872 | Kapple .......................... 297/333 |
| 168,874 | A | * | 10/1875 | Chase et al. .................. 297/334 |
| 3,556,584 | A | | 1/1971 | Simon |
| 4,639,037 | A | | 1/1987 | Maruyama et al. |
| 4,805,953 | A | * | 2/1989 | Yamauchi .................. 296/65.09 |
| 5,397,167 | A | * | 3/1995 | Fourrey et al. ............ 297/354.13 |
| 5,494,333 | A | * | 2/1996 | Wilson ..................... 297/344.18 |
| 5,588,707 | A | * | 12/1996 | Bolsworth et al. ........ 297/378.12 |
| 5,918,937 | A | * | 7/1999 | Moffa et al. .................. 297/324 |
| 6,036,266 | A | * | 3/2000 | Massara ........................ 297/328 |
| 6,099,072 | A | | 8/2000 | Sturt et al. |

(Continued)

FOREIGN PATENT DOCUMENTS

FR  1015209 A  8/1952

*Primary Examiner* — David R Dunn
*Assistant Examiner* — Timothy J Brindley
(74) *Attorney, Agent, or Firm* — Dickinson Wright PLLC (57) ABSTRACT

An adjustable seat assembly providing a compact size with the ability to pivot or tilt the lower seat frame manually and independent of the seat back.

13 Claims, 7 Drawing Sheets

(56) References Cited

U.S. PATENT DOCUMENTS

| | | | |
|---|---|---|---|
| 6,106,066 A * | 8/2000 | Moffa et al. | 297/332 |
| 6,270,141 B2 * | 8/2001 | Moon et al. | 296/65.17 |
| 6,902,236 B2 * | 6/2005 | Tame | 297/335 |
| 7,000,988 B2 * | 2/2006 | Bressler et al. | 297/325 |
| 7,901,005 B2 * | 3/2011 | Khan et al. | 297/331 |
| 8,152,240 B2 * | 4/2012 | Yamada et al. | 297/321 |
| 8,590,970 B2 * | 11/2013 | Takakura et al. | 297/334 |
| 8,616,631 B2 * | 12/2013 | Westerink et al. | 297/188.1 |
| 8,628,145 B2 * | 1/2014 | Parida et al. | 297/481 |
| 8,662,561 B2 * | 3/2014 | Runde et al. | 296/65.09 |
| 2001/0050502 A1 * | 12/2001 | Fourrey et al. | 297/331 |
| 2002/0167211 A1 * | 11/2002 | Nishi Yama | 297/378.1 |
| 2002/0171282 A1 | 11/2002 | Seibold et al. | |
| 2004/0256901 A1 * | 12/2004 | Nakaya et al. | 297/378.1 |
| 2005/0104431 A1 * | 5/2005 | Saberan et al. | 297/331 |
| 2006/0061182 A1 * | 3/2006 | Park | 297/378.1 |
| 2006/0103174 A1 * | 5/2006 | Queveau et al. | 297/15 |
| 2007/0001499 A1 * | 1/2007 | Smith | 297/362.13 |
| 2007/0216185 A1 | 9/2007 | McMillen | |
| 2009/0167046 A1 | 7/2009 | Yamagishi | |
| 2010/0084903 A1 * | 4/2010 | Kammerer | 297/329 |
| 2011/0266840 A1 * | 11/2011 | Wu | 297/41 |
| 2012/0056459 A1 * | 3/2012 | Harden | 297/316 |
| 2012/0235454 A1 * | 9/2012 | Geismar et al. | 297/239 |
| 2013/0257113 A1 * | 10/2013 | Seibold et al. | 297/183.1 |
| 2014/0001809 A1 * | 1/2014 | Line et al. | 297/378.1 |

\* cited by examiner

Cushion Design for Nominal individual

FIG. 5

Cushion tilted for 95%plus individual

FIG. 6

Cushion not tilted for 5%minus individual
FIG. 7

Seat stowed
FIG. 8

SECOND ROW PACKAGE

CROSS-REFERENCE TO RELATED APPLICATIONS

This U.S. National Stage Patent Application claims the benefit of International Application Ser. No. PCT/US11/41956 filed Jun. 27, 2011, entitled "Second Row Package", U.S. Provisional Patent Application Ser. No. 61/360,568 filed Jul. 1, 2010, entitled "Second Row Package" and U.S. Provisional Patent Application Ser. No. 61/424,226 filed Dec. 17, 2010, entitled "Second Row Vehicle Seat, the entire disclosures of all applications being considered part of the disclosure of this application, and hereby incorporated by reference.

BACKGROUND

The invention relates to a collapsible or compact seat assembly. More specifically, the present invention relates to a collapsible seat having a manual, tiltable or pivotable lower seat with minimal space requirements that can comfortably accommodate substantially all occupants, and if desired, also fold the lower seat to a stadium position.

To increase the versatility of vehicles, many modern vehicles include seats that fold or collapse. These seats commonly are designed to move to a stowed position to maximize cargo space of the vehicle. The seat must balance utility and comfort and the package of supporting system for the occupant must be minimal in size. Therefore, there is an increased need for proper and comfortable support of the occupant because of the minimal padding.

One problem with many stowable or compact vehicle seats and in particular rear vehicle seats is that these seats are currently only comfortable for a limited segment of the population. As vehicles become more compact and consumers demand more functionality from their vehicles, manufacturers strive to improve the comfort of these seats for a wider segment of the population.

One issue with improving the comfort of stowable and compact seats is that various design configurations and requirements prevent or limit designers from incorporating many comfort features from front seats of vehicles or fixed rear seats of vehicles. For example, space and folding requirements may prevent or limit certain features from being included. In addition, given that most rear seats in vehicles are used less than the front seats, manufactures generally desire to reduce or minimize the weight of the rear seats to improve fuel economy. Other comfort features found in front seats, such as power tilt of the seat to adjust the angle of the lower seat cushion are generally not cost effective on most vehicles for the rear seats.

SUMMARY

The invention relates to a collapsible or compact seat assembly. More specifically, the present invention relates to a collapsible seat having a manual, tiltable or pivotable lower seat with minimal space requirements that can comfortably accommodate substantially all occupants.

The seat of the present invention includes a pivotable lower seat cushion that allows an occupant to easily raise or lower the height of the front edge of the seat thereby changing the angle of the seat cushion. The present invention also allows for easy adjustment while the occupant is in the seat, without the use of additional aids such as springs, struts or expensive powered adjustments. More specifically, the seat cushion is configured to pivot about an axis that is proximate to the area of the seat receiving the most applied mass, typically near the hip bones of the seat occupant. The present invention uses a linkage system to create the defined pivot for angle adjust and stow combined with a collapsible strut to give defined angle adjustment, while remaining compact, cost effective and lightweight. The adjustable legs in some instances may also extend to allow the seat to enter a stadium position, thereby increasing potential cargo and space options in the vehicle.

DESCRIPTION

The present invention, as illustrated in the Figures, is generally directed to a seat assembly 40 for a vehicle (not illustrated). The seat assembly 40, as illustrated in the Figures, shows a compact and/or collapsible seat for use in a vehicle. More specifically, the seat assembly 40 illustrated is particularly applicable to an exemplary second row of seats in the cab of a vehicle, for example, Compact Car or Sport Utility. The seat assembly 40 is shown in an exemplary collapsed or otherwise known as the stowed position in FIGS. 3 and 8, in an exemplary useable or open position in FIGS. 1-2 and 4-7 and in FIG. 11 in a stadium position. The seat assembly 40 may provide a very small package size when stowed along with providing known occupant comfort and safety features such as lumbar support, compliant support, a head restraint, recline, and an adjustable pivoting lower seat. In addition, the seat assembly 40 provides easy access under the bottom of the seat bottom for storage of other objects while in the open or seating position. The illustrated seat assembly 40 and design are exemplary seat assemblies and may vary in style, design, shape, size and configuration. While reference is made to seat assemblies used in a vehicle, it should be understood that the present invention may be used in many other applications, including, among others, airline, mass transit and entertainment seating applications.

The seat assembly 40 includes a lower seat portion 44, seat back 46 and may include a head restraint (not illustrated). The seat assembly 40 includes a seat frame 49 having a core (not illustrated) and a trim cover 42, such as a leather or fabric material. It should be understood that the core may also be known as a foam core which may be made of any number of known materials including, but not limited to, polypropylene, polyurethane, or expanded polypropylene. The seat frame 49 provides the desired structural support for the seat assembly 40 and generally includes a lower seat frame portion 50, coupled to an upper seat frame portion 70 with a base 90, a linkage assembly 200 and adjustable legs 250.

Figure 1:
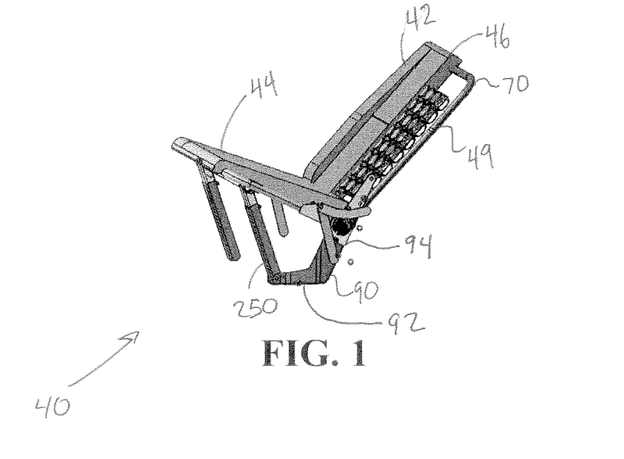
FIG. 1 illustrates a partial perspective view of a vehicle seat with the upper seat portion reclined and the lower seat portion being tilted upward.
Figure 2:
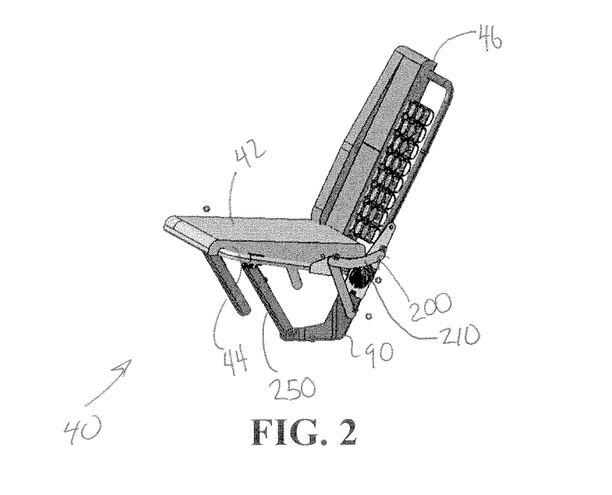
FIG. 2 illustrates the seat assembly of FIG. 1 with the upper seat portion having less recline than in FIG. 2 and the lower seat portion being in a lower position with the front edge of the lower seat portion closer to the floor than in FIG. 1.
Figure 3:
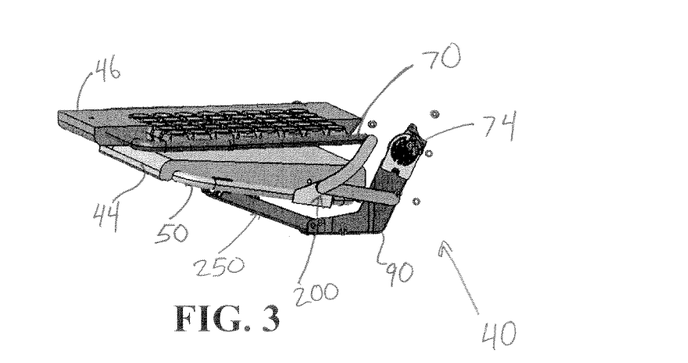
FIG. 3 illustrates a partial perspective view the seat assembly from FIGS. 1 and 2 in an exemplary stowed position.

As further illustrated in FIGS. 1 and 2, the seat assembly 40 is in the open or seating position. In the open or seating position, the seat back 46 is angled relative to and not substantially aligned with the rear wall of a vehicle. The lower portion of the seat back 46 near the recline pivot axis 74 for the recline mechanism, if included, is positioned at its maximum distance from the rear wall. The lower seat portion 44 extends outwardly from the rear wall to provide a seating surface and the adjustable legs are acutely angled relative to the lower seat portion 44 and extend from the frame of the lower seat portion 44 toward the base 90, or in some embodiments the floor of the vehicle. The seat assembly is illustrated in FIG. 3 in the stowed position. The lower seat portion 44 is substantially aligned with and against the seat back 46.

Figure 4:
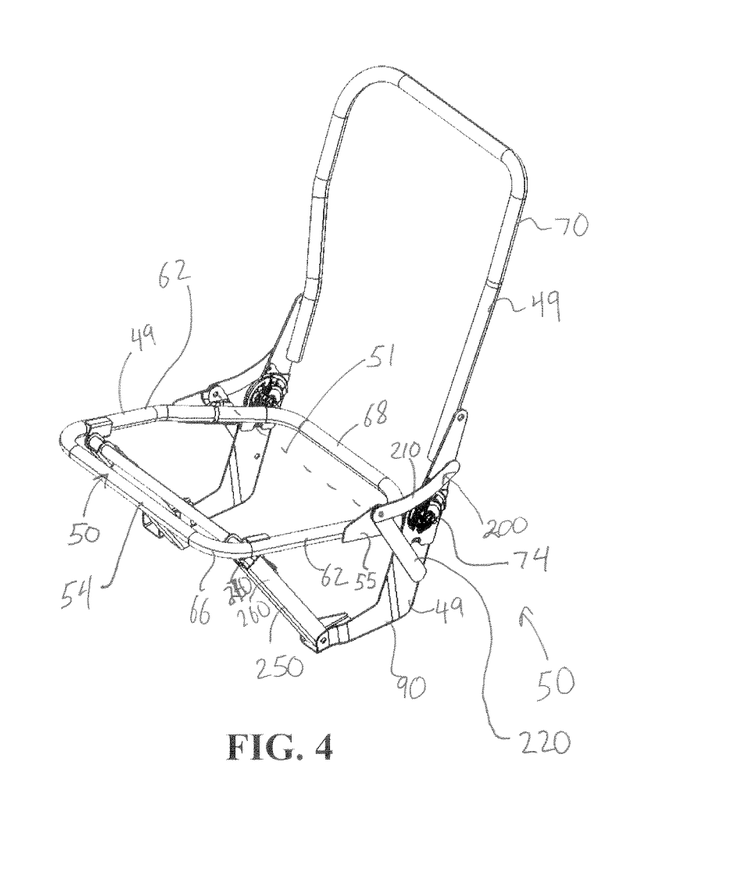
FIG. 4 illustrates a perspective view of the frame and linkage assembly of the seat in FIGS. 1-3.

FIG. 4 provides more detail regarding the seat frame 49 as well as the bottom frame 50, the back frame 70, the linkage assembly 200, base 90 and adjustable legs 250. The bottom and back frames 50, 70 are shown as made of tubular steel; however, it should be appreciated that many other materials and shapes may be used to form the bottom and back frames 50, 70 including for example, a C-shaped steel frame. The bottom frame 50 includes an outer frame extent 66 having two lateral sides 62, a front extension 54 and a rear cross member 68. The bottom frame 50 is pivotably connected to the legs 250 and linkage assembly 200. In turn the linkage assembly 200 is coupled to the seat back frame 70 and base 90. The bottom frame 50 is also supported in the open position by the legs 250.

The base 90 may be formed at any desired style, shape, size and configuration which may depend upon the location of the seat assembly 40 as well as the size, shape or other features of the seat assembly 40. The base 90 generally anchors the seat assembly 40 to the floor of a vehicle or other secure surface to provide support for the seat occupant. As illustrated in the Figures, the base 90 includes a forward extending member 92, as well as an upwardly extending member 94 however other styles, shapes and configurations as discussed above may be used.

As illustrated in the Figures and in particular FIG. 4, the present invention uses a linkage assembly 200 to couple the lower seat frame 50 to each of the base 90 and upper seat frame 70. The linkage assembly 200 further includes a lower seat pivot axis 51 about which the lower seat 44 and in particular the lower frame 50 is configured to pivot. The linkage assembly 200 illustrated in the Figures is an exemplary linkage assembly and other styles of linkage assemblies or configurations may be used in place so long as they provide a pivot axis 51 in the desired location that allows the ease of pivoting of the lower seat as described above.

Figure 5:
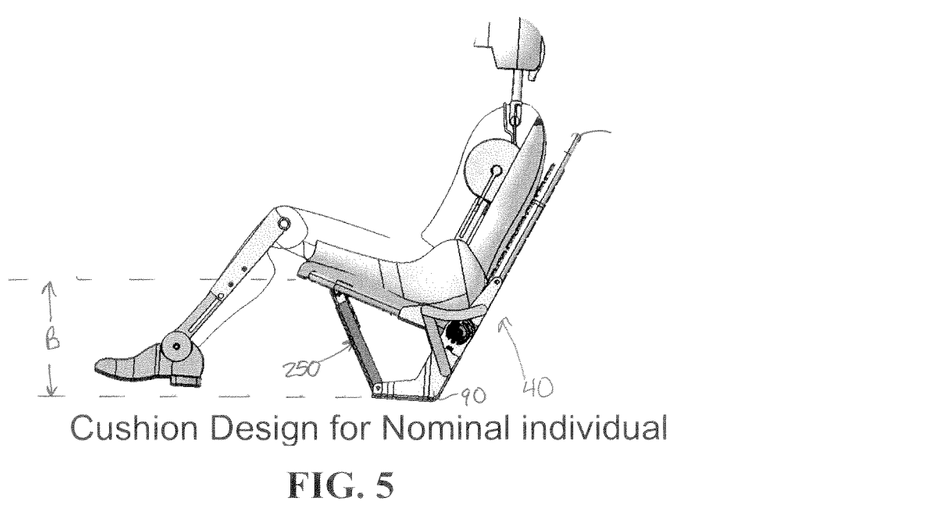
FIG. 5 illustrates a side view of the seat in a seating position for an average occupant.
Figure 6:
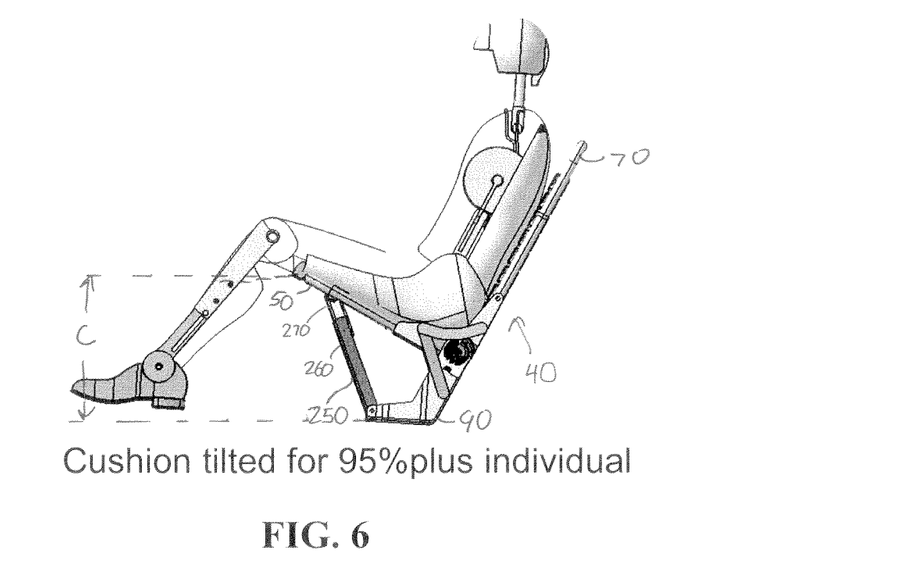
FIG. 6 illustrates a side view of the seat in a raised position to accommodate an occupant with longer legs than the seat in FIG. 5.
Figure 7:
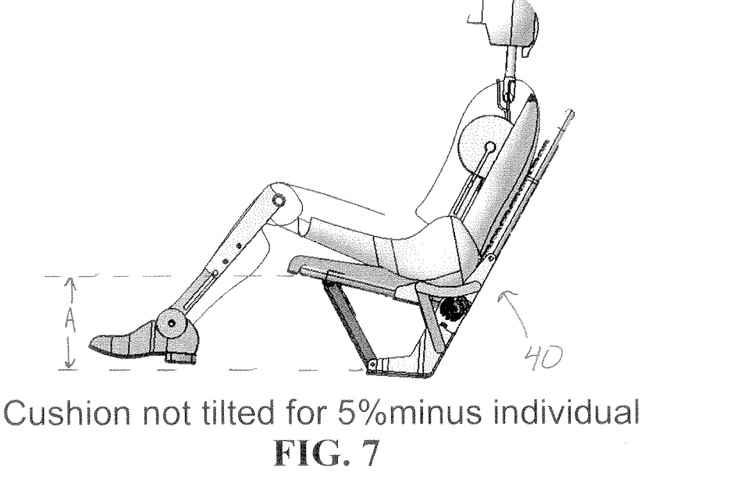
FIG. 7 is a side view of the seat in a lowered position to accommodate smaller adults and children.

As described in greater detail above, the present invention provides a seat assembly 40 specifically a lower seat portion 44 that may pivot about the lower pivot axis 51 such that a vehicle occupant located in the seat may adjust the angle of the lower seat relative to the base 90 or relative to a floor of a vehicle (not illustrated) and in particular, the height of the front edge 54 relative to the floor. This allows the vehicle occupant to configure the seat easily to be comfortable to sit in even though the seat occupants have wide ranging lengths of legs or heights. The present invention allows this pivoting through particular location of the pivot axis 51, approximately located or passing through the areas where the most weight is applied to the lower seat bottom, typically close to the location of the hips of the seat occupant as illustrated in FIGS. 5-7. By locating the lower pivot axis 51, in this location the lower seat may be pivoted and in particular the front portion 54 of the lower seat frame 50 may articulate up and down relative to the floor with little effort by the vehicle in particular the seat occupant such that a power tilt function is not needed thereby saving weight and cost.

Figure 11:
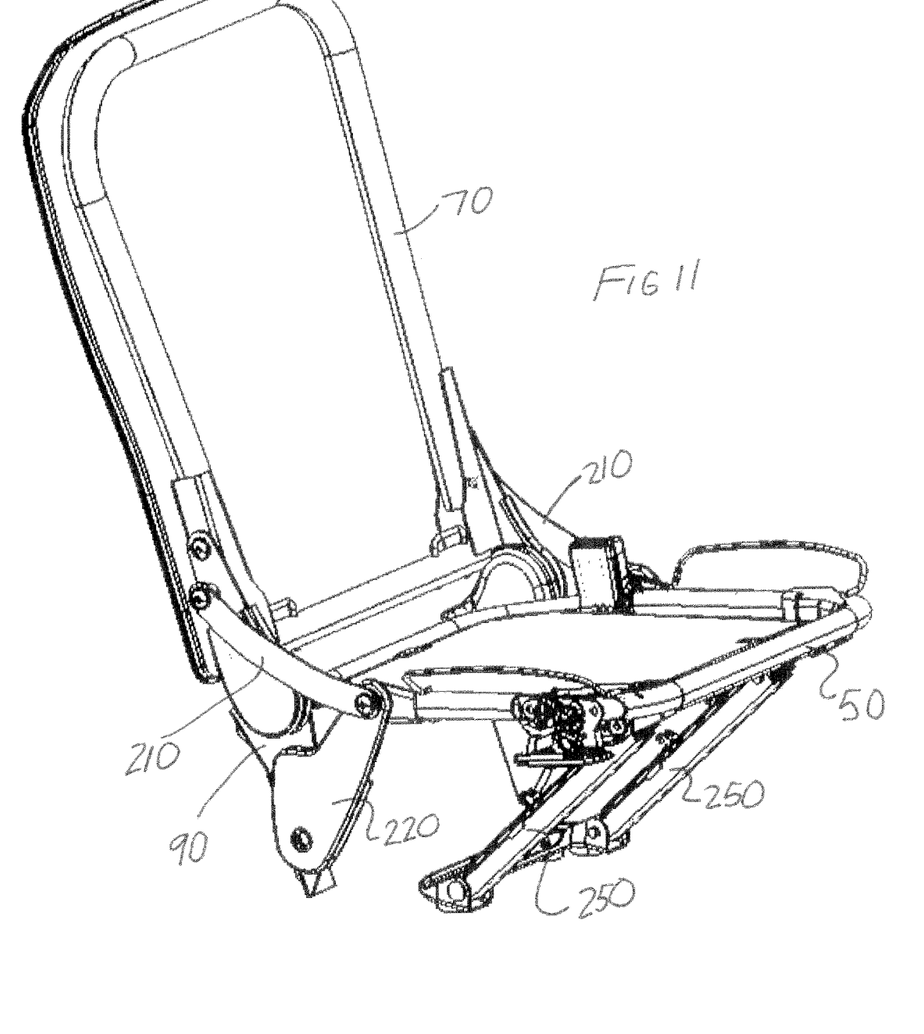
FIG. 11 is a perspective view of a second exemplary seat in an open position.
Figure 12:
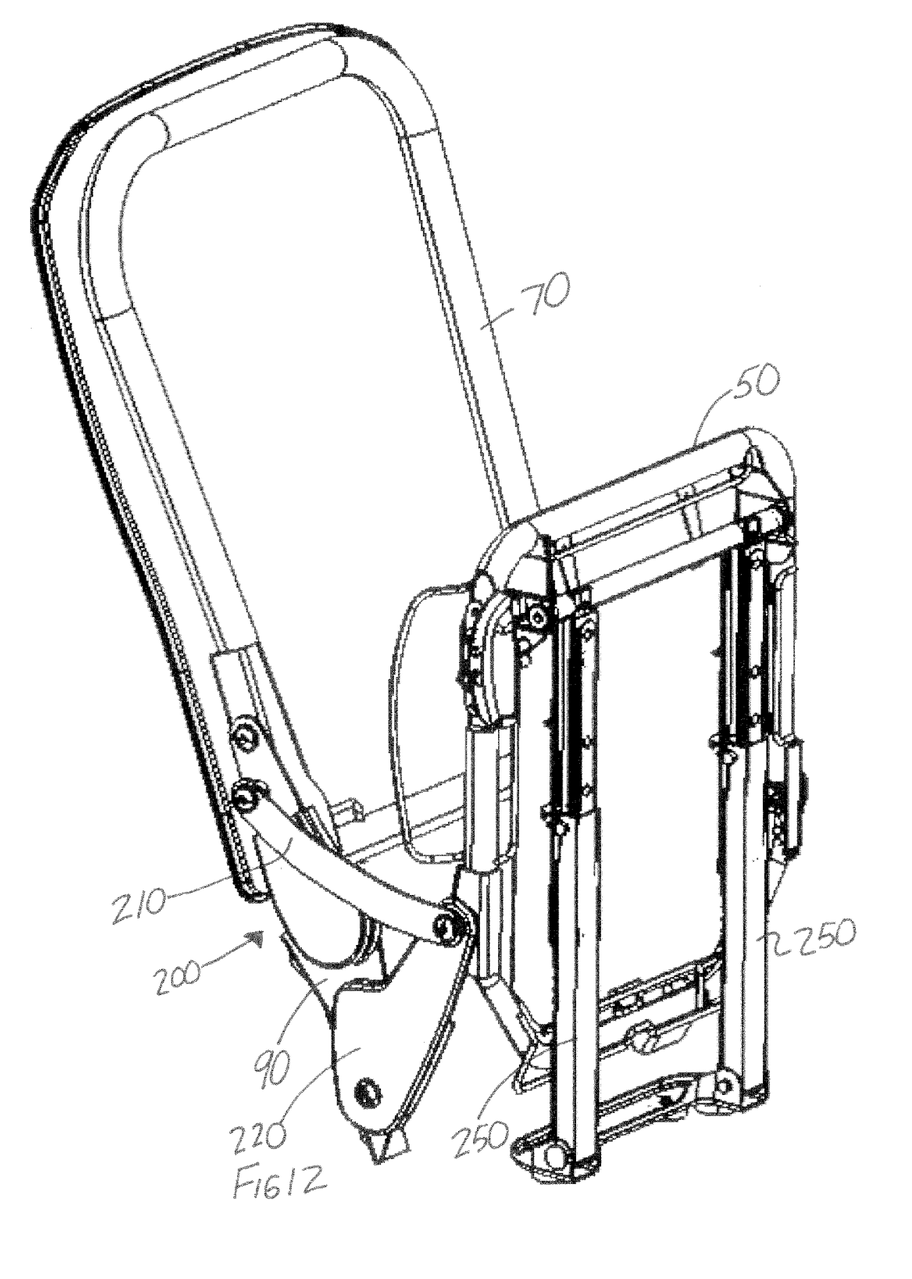
FIG. 12 is a perspective view of the seat in FIG. 11 in a stadium position.

While the linkage assembly 200 and lower seat frame 50 cooperate to pivot freely about the lower pivot axis 51, the leg assembly 250 is configured to extend and retract as the front portion 54 of the seat frame moves up and down with the above described pivoting of the lower seat frame 50. As the leg assembly 250 extends and retracts, it will be locked into various positions. As illustrated in FIGS. 5-7, three different positions of the leg assembly 250 are illustrated such as in FIG. 5 an intermediate position, FIG. 6 an extended position and in FIG. 7 a retracted position. A stadium position of the legs is illustrated in FIG. 11. Any type of release and locking mechanism to easily release or lock the legs in the desired position may be used. For example, the legs may use a simple rack and pinion system or a frictional engagement system that may be controlled by the occupant of the seat assembly 40. A spring-assist assembly located about the pivot axis 51 or within the leg assembly 250 may also be included to assist in the movement or pivoting of the lower seat 44. While the Figures only illustrate three positions for the seat, it should be understood that the seat could have many more positions of extension or retraction such that an individual may fine tune the seat to their desired comfort. While the Figures illustrate the use of a pair of leg assemblies 250, in some embodiments a single leg may also be used.

Figure 8:
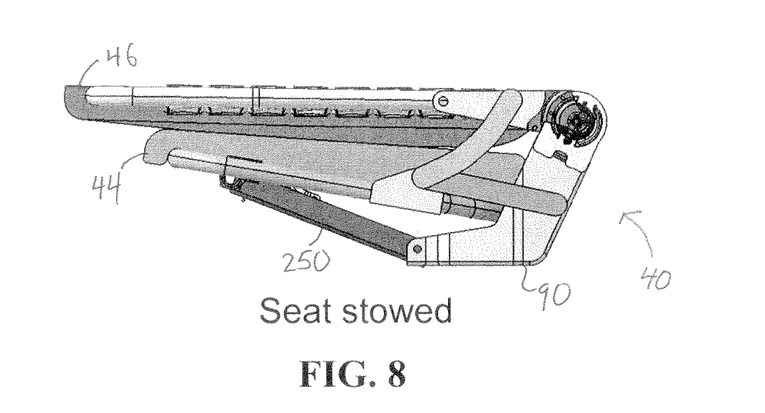
FIG. 8 is a side view of the seat in an exemplary folded position.
Figure 9:
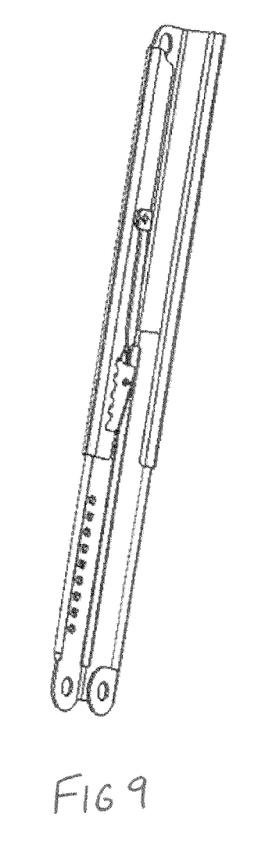
FIG. 9 is a first perspective view of the adjustable legs extended to a stadium position.
Figure 10:
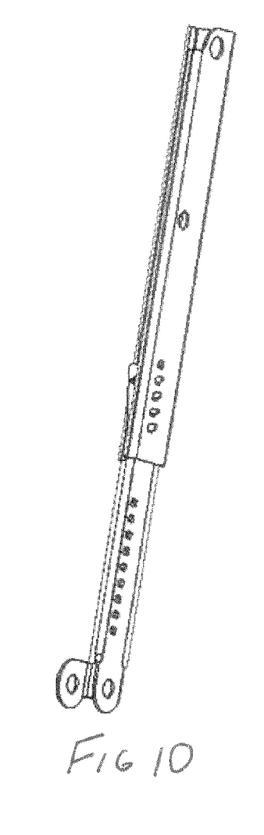
FIG. 10 is a second perspective view of the adjustable legs in FIG. 9.

The upper frame 70 may also be configured to recline such as about the recline pivot axis 74 illustrated in FIG. 4. Adding recline to the seat assembly as illustrated in recline position in FIG. 1 and a more upright position in FIG. 2 allows the occupant to tailor the comfort of the seat back 46 to their desired configuration. It should be noted that the present invention allows for recline and pivoting not only of the seat back 46 but also the seat cushion or lower seat 44 while the occupant is located in the seat. In addition, the seat is configured to fold such as illustrated in FIGS. 3 and 8 for stowing. The seat 40 may also stow into different configurations such as folding the lower seat portion 44 upward against the seat back 46.

The linkage assembly 200 may have various styles, shapes and configurations however is generally attached to the base 90 or the floor of the vehicle as well as the lower seat frame and upper seat frame. Through this three-point attachment, support is provided for the lower seat frame 50 with pivoting capability as well as affixing the lower seat frame 50 relative to the upper seat frame 70 and allows for stowing or folding of the seat. The pivot link assembly 200 generally includes a driving link 210 extending between the lower seat frame 50 and the upper seat frame 70 coupled at the pivot axis 51. A rear link 220 is coupled at or proximate to the same pivot axis 51 in a pivoting fashion to a lower seat frame 50. The rear link 220 extends from the lower seat frame 50 to the base 90. The base 90 also locates along with the upper seat frame 70 the spacing between the ends of the driving link 210 and rear link 220. The lower seat frame 50 also shows a plate 55 coupled between the driving link 210 and rear link 220 and the lower seat frame 50 such that the pivot axis 51 may be raised relative to the seating portion of the lower seat 44. While other configurations may be used, this plate 55 is helpful to move the pivot axis 51 above the frame such that the pivot axis is proximate to the center of gravity of the applied weight to the lower seat portion, which allows in turn for easier pivoting of the lower seat frame 50 to the desired position. While the driving link 210 is illustrated as having an arcuate shape, this could also be accomplished in a straight configuration or other shapes so long as the driving link can keep the upper seat frame relative to the pivot axis 51. The curve of the driving link 210 is only to minimize the amount of the link 210 that may be visible or felt by an occupant.

In operation, a user would enter the vehicle seat and determine that adjustment is needed to improve the comfort level of the seat. The user would then release the lock or retention mechanism (not illustrated) that prevents the lower seat frame 50 from pivoting relative to the base 90 or more specifically, about the pivot axis 51. While sitting in the seat, the user would either raise the front edge 54 of the seat frame 50 or lower it to fit the occupant with the desired comfort. Once the position of the front of the seat frame 54 is positioned relative to the floor, the occupant would release the retention mechanism (not shown) which would lock either the lower seat frame 50 about the pivot axis 51 or lock the legs 250 in place such that they do not extend or retract. As illustrated in the Figures, the exemplary leg assembly 250 includes an outer 260 and inner 270 portions that slide relative to each other allowing for the extension and retraction desired. The user also if a recline mechanism or recline axis 74 is provided for the seat back 46 may adjust the recline to the desired position. Although not necessary, in some embodiments a track assembly may also be located in the floor to allow the user to move the seat forward or back to increase or decrease the amount of recline that available.

In some embodiments, a spring assist may be provided to help pivot the lower seat frame 50 about the pivot axis 51 however with the pivot axis 51 located as described in the above invention, it is believed that the lower seat frame 50 will pivot easily while the seat is occupied by an individual without any additional spring assistance or tension assistance.

Although as illustrated, the pivot axis 51 acts as a pivot axis for both the driving link 210 and the rear link 220 when coupled to the plate 55 on the seat frame 50, in some embodiments, each of the driving link 210 and rear link 220 may be pivotly coupled to the lower seat frame 50 in close proximity but not about the same pivot axis. Further, in other embodiments, one of the rear link and driving link may be coupled separately from the pivot axis 51 using a slot assembly (not illustrated) to allow for greater movement while providing the desired support and functionality.

When the occupant is not located in the vehicle to stow the seat, the illustrated seat may be easily stowed by releasing the retention mechanism on the leg assembly or pivot axis 51 such that the lower seat 44 may be pivoted or tilted upward to be stowed against the seat back 46 (upright stowed position not illustrated in the Figures). In some embodiments, the legs 250 may separate the inner and outer leg portions 260, 270, or the legs 250 may articulate backwards and using the existing retention assembly, lock the lower seat 44 in an upright position. As illustrated in FIGS. 3 and 8, to stow the seat, the seat may exemplary be stowed by reclining the seat back 46 forward flat against the lower seat portion 44.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A seat assembly comprising:
a lower seat portion including a bottom frame;
a seat back including a back frame;
a base and wherein said back frame is pivotably coupled to said base and wherein said base includes a first member and a second member each coupled to opposing sides of said back frame;
a first and second linkage assembly and wherein said first linkage assembly extends between said first member and each of said bottom frame and said back frame, and said second linkage assembly extends between said second member and each of said bottom frame and said back frame;
wherein each of said linkage assemblies includes a first link extending between said bottom frame and said back frame and a second link extending between said bottom frame and one of said first and second members of said base and wherein said second link is coupled to one of said first and second members; and
an adjustable leg assembly extending from said base to said bottom frame.

2. The seat assembly of claim 1 wherein said leg assembly includes a first adjustable leg extending from said adjustable first member to said bottom frame and a second adjustable leg extending from said second member to said bottom frame and wherein said first and second adjustable legs are coupled to opposing sides of said bottom frame.

3. The seat assembly of claim 1 wherein said first member and said second member each include an upper portion and a forward portion at opposing ends of said first and second members and wherein said leg assembly is coupled to said forward portion and said back frame is coupled to said upper portion.

4. The seat assembly of claim 1 wherein said first and second linkage assemblies are configured to place said seat bottom in a first position relative to said base when the seat assembly is in an open position and a second position relative to said base when the seat assembly is in a stowed position relative to the base and wherein in said stowed position said seat back is folded over said lower seat portion and said first position is displaced from said second position.

5. The seat assembly of claim 4 wherein said first link and said second link have a common pivot axis.

6. The seat assembly of claim 5 wherein said linkage assemblies further include a plate and wherein said plate is coupled to said bottom frame and said first and second links are coupled to said plate and at the point of said common pivot axis and wherein said common pivot axis is displaced from said bottom frame.

7. The seat assembly of claim 6 wherein said common pivot axis is approximately aligned with the expected center of gravity of an occupant of the seat.

8. The seat assembly of claim 1 wherein said lower seat portion is configured to pivot relative to said back frame and wherein said bottom frame does not pivot about the same axis as the back frame.

9. The seat assembly of claim 1 wherein each of said leg assembly is capable of extending to allowing pivoting of the bottom frame, and wherein in a seating position, the lower seat has the ability to pivot up to fifteen degrees relative to the base in an open position.

10. The seat assembly of claim 8 wherein said leg assembly includes first and second adjustable legs and wherein said adjustable legs are extendable members and wherein said legs are in a compact position when said seat is in a stowed position, in a intermediate position when said seat assembly is in an open position and in an extended position when said lower seat is folded to a stadium position.

11. The seat assembly of claim 10 wherein said intermediate position includes a range of selected positions between said compact position and said extended position.

12. The seat assembly of claim 1 wherein said legs include a lock assembly to set the desired position.

13. The seat assembly of claim 1 wherein said legs are within thirty degrees of vertical when the lower seat is in a stadium position.

* * * * *